United States Patent [19]
Iverson, Jr. et al.

[11] Patent Number: 5,422,348
[45] Date of Patent: * Jun. 6, 1995

[54] METHOD FOR INHIBITING THE FORMATION OF CRYSTALLINE MINERAL DEPOSITS ON PLANTS

[75] Inventors: Thomas Iverson, Jr., Yakima; Joyce Prindle, Olympia, both of Wash.

[73] Assignee: CH₂O Incorporated, Olympia, Wash.

[ * ] Notice: The portion of the term of this patent subsequent to Nov. 29, 2011 has been disclaimed.

[21] Appl. No.: 311,067

[22] Filed: Sep. 23, 1994

Related U.S. Application Data

[63] Continuation-in-part of Ser. No. 52,065, Apr. 22, 1993, Pat. No. 5,369,099.

[51] Int. Cl.$^6$ ............................................. A01N 57/12
[52] U.S. Cl. ...................................... 514/108; 47/58; 71/DIG. 1
[58] Field of Search .......................... 514/108; 47/58; 71/DIG. 1

[56] References Cited

U.S. PATENT DOCUMENTS

| | | | |
|---|---|---|---|
| 3,149,151 | 9/1964 | Schiefer et al. | 260/502 |
| 3,150,081 | 9/1964 | Haslam | 210/58 |
| 3,214,454 | 10/1965 | Blaser et al. | 260/429.9 |
| 4,649,025 | 3/1987 | Hwa et al. | 422/15 |
| 4,802,990 | 2/1989 | Inskeep, Jr. | 210/699 |
| 5,171,477 | 12/1992 | Kreh | 252/389.23 |
| 5,369,099 | 11/1994 | Iverson, Jr. et al. | 514/108 |

OTHER PUBLICATIONS

Irrigation Journal, May/Jun. 1987, "Conditionerigation: New Process Proves Successful", pp. 12–14.
3 Sheets from Unocal Agriproducts advertising, Unocal 76, P.O. Box 60455, Los Angeles, Calif. 90060., 1992, 1994.

*Primary Examiner*—Richard L. Raymond
*Assistant Examiner*—Brian G. Bembenick
*Attorney, Agent, or Firm*—Teresa J. Wiant

[57] ABSTRACT

The present invention provides an improved method for growing a plant sprayed with hard water while inhibiting the formation of crystalline mineral deposits on the plant. According to the present invention, an effective amount of 1-hydroxyethane 1, 1-diphosphonic acid (HEDPA) is admixed with water and sprayed on the plant resulting in the formation of an amorphous powder on the plant. According to another aspect of the present invention, the method further includes providing mechanical agitation to prevent a buildup of amorphous powder on the plant.

15 Claims, No Drawings

METHOD FOR INHIBITING THE FORMATION OF CRYSTALLINE MINERAL DEPOSITS ON PLANTS

RELATED APPLICATION

This application is a continuation-in-part of application Ser. No. 08/052,065, filed Apr. 22, 1993, (U.S. Pat. No. 5,369,099) and entitled "A Method and Composition for Inhibiting the Formation of Hard Water Deposits on Fruit."

TECHNICAL FIELD

This invention relates to a method of growing plants and, more particularly, to a method of using source water to water the plants while inhibiting the formation of crystalline mineral deposits on the plants.

BACKGROUND INFORMATION

A plant may be sprayed with water for the purpose of irrigation, temperature control, pest control, or fertilization. If the water contains minerals, a crystalline mineral deposit will be remain on the plant after the water has evaporated. The presence of crystalline mineral deposits on a plant can detract from the health and marketability of the plant.

DISCLOSURE OF THE INVENTION

The present invention provides a method of growing a plant while creating an amorphous powder and minimizing the accumulation of the amorphous powder on the plant. The method comprises providing water containing deposit forming minerals and forming a mixture by admixing an effective amount of 1-hydroxyethane 1,1-diphosphonic acid (HEDPA) with the water. The HEDPA is present in an amount sufficient to alter the deposit forming minerals such that, following evaporation of the water, the minerals will appear as an amorphous powder. A first portion of the mixture is applied to a plant such that a part of the first portion of the mixture contacts the surface of the plant. The first portion of the mixture is allowed to evaporate from the surface of the plant such that a first layer of an amorphous powder is formed on the surface of the plant. Then, a second portion of the mixture is applied to the plant. The second portion has a flow sufficient to wash substantially all of the first layer of the amorphous powder off of the surface of the plant. The method may further include allowing the second portion of the mixture to evaporate from the surface of the plant such that a second layer of an amorphous powder is formed on the surface of the plant. Then, a third portion of the mixture is applied to the plant with the third portion having a flow sufficient to wash substantially all of the second layer of the amorphous powder off of the surface of the plant such that substantial accumulation of amorphous powder on the plant is minimized.

Preferably, the effective amount of HEDPA is at least $\frac{1}{4}$ ppm. in a more preferred form of the invention, the effective amount of HEDPA is between about $\frac{1}{4}$ ppm to about 5 ppm. In an even more preferred form of the invention, the effective amount of HEDPA is about 1 ppm.

In another preferred form of the invention, the flow of the second portion of the mixture is at least eight gallons per minute per acre. In a more preferred form of the invention, the flow of the second portion of the mixture is between eight gallons per minute per acre and forty gallons per minute per acre. in an even more preferred form of the invention, the flow of the second portion of the mixture is about twenty-five gallons per minute per acre.

The present invention also provides an improvement of a method for growing a plant by spraying the plant with water which touches a surface of the plant, wherein the water contains deposit forming minerals. The improvement comprises admixing an effective amount of HEDPA with the water to form a water mixture. The HEDPA is present in an amount sufficient to alter the deposit forming minerals such that, following evaporation of the water, the minerals will appear as an amorphous powder. A first portion of the water mixture is applied on a surface of the plant. A sufficient time for evaporation of the water is allowed to pass such that an initial layer of amorphous powder is formed on the surface of the plant. Then, a second application of the water mixture is applied on the surface of the plant. The second application of the water mixture has a sufficient flow to wash substantially all of the initial layer of amorphous powder off of the surface of the plant.

The method may further include applying a portion of the water mixture periodically to prevent an accumulation of the amorphous powder. The portion of the water mixture has a flow sufficient to wash substantially all of the previously formed amorphous powder off of the surface of the plant.

The present invention also provides a method for growing a plant comprising providing water containing deposit forming minerals. A water mixture is formed by admixing an effective amount of HEDPA with the water. The HEDPA is present in an amount sufficient to alter the deposit forming minerals such that, following evaporation of the water, the minerals will appear as an amorphous powder. A portion of the water mixture is applied to a plant such that the portion of the water mixture contacts a surface of the plant. The portion of the water mixture is allowed to evaporate from the surface of the plant such that an amorphous powder is formed on the surface of the plant.

The method may further include mechanically agitating the amorphous powder on the plant such that the amorphous powder is moved out of contact with the surface of the plant. The mechanical agitation may be provided by applying a second portion of the water mixture to the surface of the plant. The second portion has a flow sufficient to wash substantially all of the amorphous powder which was previously formed off the surface of the plant. Alternatively, the mechanical agitation may be provided by applying a flow of air across the surface of the plant. In yet another form of the invention, the mechanical agitation can be made by mechanically brushing the amorphous powder from the surface of the plant. Lastly, the mechanical agitation can be provided by mechanically washing the amorphous powder from the surface of the plant.

These and other advantages and features will become apparent from the detailed description of the best mode for carrying out the invention that follows.

BEST MODE FOR CARRYING OUT THE INVENTION

When a plant is sprayed with water which contains deposit forming minerals, a crystalline mineral deposit remains on the plant after the water has evaporated.

The crystalline mineral deposit is strongly adhered to the plant and is therefore difficult to remove. The presence of the crystalline mineral deposit may be detrimental to the plant in a number of ways. Firstly, the crystalline mineral deposit contains alkaline salts which can cause "burning" of the plant resulting in the plant becoming dry and brittle. Secondly, the crystalline mineral deposit forms a barrier between the foliage and light, decreasing the ability of the plant to photosynthesize carbohydrates. Thirdly, if the plant is being grown for aesthetic purposes, the deposits can mar the appearance of the plant resulting in a decrease in the market value of the plant. Lastly, if the crystalline mineral deposit forms on the fruit or the flowers of the plant, the fruit or flowers may have a lower market value.

Herein the term "plant" refers to any type of plant, such as a tree, shrub, flower, herb, vine, or grass. Plant surfaces which may benefit from the method of the present invention include plant foliage, stems, trunks, roots, flowers, or fruit. Herein, the term fruit refers to any product of plant growth, for example, grains, leaves, cotton, cucumbers, grapes, apples, oranges, and peppers.

Generally, water for spraying on a plant is supplied from sources such as wells, rivers and lakes. Such water is termed source water. Source water is generally hard, referring to the presence of any or all of the following in the water: calcium, iron, silicate, magnesium, sodium chloride, sodium bicarbonate, sulfate, nitrates, and fluoride. The amount of hardness of water is measured in parts per million (ppm). Typically, source water has a hardness between about 20 ppm to about 450 ppm. When a plant is sprayed with hard water, strongly adhered crystalline mineral deposits form on the surface of the plant.

According to the present invention, an effective amount of HEDPA is admixed to the source water. As the plant grows, it is sprayed with the water mixture which includes the HEDPA. A portion of the water mixture contacts the surface of the plant. It has been found that formation of crystalline mineral deposits on the plant is severely inhibited, and often is virtually eliminated. Instead, an amorphous powder is formed on the surface of the plant. The amorphous powder is easily washed or wiped off of the plant.

HEDPA is an alkyl diphosphonate. A commercially available form of HEDPA is termed 1-hydroxyethane 1,1-diphosphonic acid and has the following structure:

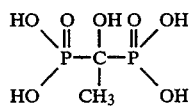

Herein HEDPA is used to describe a number of behave alike alkyl diphosphonates of the basic structure:

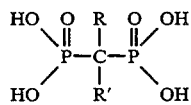

The following is a list of known HEDPA variants and their structures which indicate what constitutes and may be represented by -R and R':

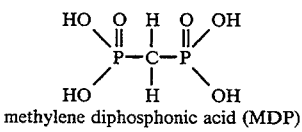
methylene diphosphonic acid (MDP)

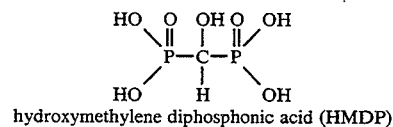
hydroxymethylene diphosphonic acid (HMDP)

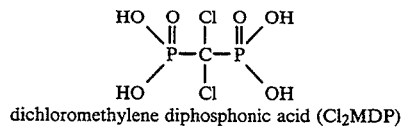
dichloromethylene diphosphonic acid (Cl$_2$MDP)

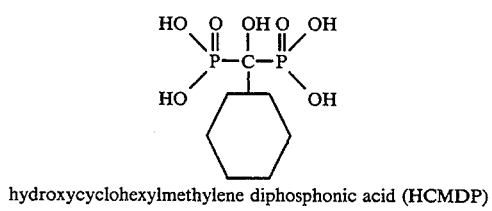
hydroxycyclohexylmethylene diphosphonic acid (HCMDP)

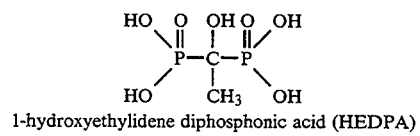
1-hydroxyethylidene diphosphonic acid (HEDPA)

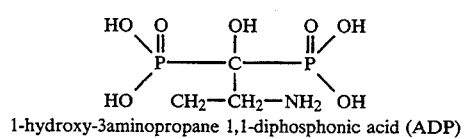
1-hydroxy-3aminopropane 1,1-diphosphonic acid (ADP)

An effective amount of HEDPA may be provided in the water mixture when there is as little as $\frac{1}{4}$ ppm HEDPA. In some circumstances, additional amounts of HEDPA may be needed. It has been found that the amount of HEDPA which is needed increases when the hardness of the water increases. Seldom is more than 5 ppm HEDPA necessary. In fact, usually no more than 1 ppm is needed. Although, adding additional HEDPA has not been found to negatively impact the formation of amorphous powder on a plant. But, as additional HEDPA is added to water, the cost of utilizing this invention increases.

The effective amount of HEDPA is added to the water before the water is applied to the plant. In a preferred form of the invention, a metering pump is provided and operably attached to a water feed line. The metering pump is set to feed an effective amount of the HEDPA into the water. Then, the water and HEDPA mixture is applied to the plant by any suitable method such as spraying, fogging, or drip irrigation.

When the water mixture is applied to the plant over a period of time, amorphous powder will accumulate on the surface of the plant. The accumulation of amorphous powder on the surface of the plant acts as a barrier to light, reducing the ability of the plant to photosynthesize carbohydrates. Accordingly, in a preferred form of the invention, the amorphous powder is periodically removed from the surface of the plant. The amorphous powder may be removed from the plant by any mechanical agitation which causes the amorphous powder to fall from or be moved out of contact with the surface of the plant. For example, the amorphous powder may be removed from the plant by blowing a gust or flow of air across the surface of the plant, by mechanically shaking the plant, by brushing the amorphous powder from the plant, by applying a flow of water across the plant surface, or by mechanically washing the powder off of the surface plant. The washing of the plant surface may include immersing the plant surface in a water bath with or without the addition of cleansers or detergents.

In a preferred form of the invention, the plant is periodically sprayed with a mixture of hard water and HEDPA where the mixture has a flow rate sufficient to wash substantially all of the previously formed amorphous powder off of the surface of the plant. After the water evaporates, a new layer of amorphous powder is left on the surface of the plant. This new layer of amorphous powder is washed off of the surface of the plant by another application of the water and HEDPA mixture at a sufficient flow rate. This process of washing off the previously formed amorphous powder by spraying with a mixture of water and HEDPA is continued to prevent a buildup of amorphous powder on the plant. At harvest, a small amount of amorphous powder formed by the last watering will remain on the plant surface. The small amount of powder may be removed by shaking the plant or application of a simple washing process.

The application of the mixture of hard water and HEDPA with a flow sufficient to wash substantially all of the previously formed amorphous powder off of the surface of the plant may be accomplished by any type of watering system which causes a part of the water mixture to come in contact with the surface of the plant. For example, overhead irrigation systems, sprinklers, drip irrigation, and foliage feeding methods may be used. Preferably, the flow rate is at least about eight gallons per minute per acre. At lower flow rates, part of the amorphous powder will be moved out of contact with the surface of the plant, but more dramatic results are shown at flow rates of at least about eight gallons per minute per acre. Preferably, the flow rate is between eight gallons per minute per acre and forty gallons per minute per acre. In fact, it has been found that virtually all of the previously formed amorphous powder is moved off of the surface of the plant when the flow rate is about twenty-five gallons per minute per acre.

The method of the present invention may be practiced in orchards or fields where plants are sprayed with water by overhead or above ground irrigation systems. The method may also be practiced on crops or orchards which are being sprayed with water for purposes other than irrigation, such as cooling, frost protection, pest protection, and leaf or foliage feeding. In addition, the present invention may be practiced in nurseries and greenhouses.

Accordingly, the present invention provides an economical and simple method for inhibiting the formation of crystalline mineral deposits on plants. The following examples are provided to illustrate the invention, but are not to be construed as limiting the invention in any way except as indicated in the appended claims.

EXAMPLE 1

A sprayer system was installed in an apple orchard. The sprayer system included a metering pump attached to the feed line of the sprayer system. Water was fed through the feed line with a hardness of about 20 ppm. The metering pump metered in 5 ppm of HEDPA to the water. The water was sprayed onto the orchard with a flow of twenty gallons per minute (gpm) per acre. The water was allowed to evaporate from the surface of the apple trees, resulting in the formation of an amorphous powder on the surface of the trees, including the foliage and apples. Another application of water containing five parts per million of HEDPA was sprayed onto the orchard with a flow rate of 20 gpm per acre.

Following evaporation of the water, a small amount of amorphous powder remained on the foliage and fruit of the trees. The remaining amorphous powder was easily wiped from the surface of the foliage and fruit.

EXAMPLE 2

Example 1 was repeated using a flow rate of 4 gpm per acre for the second application of water and HEDPA. Following evaporation of the water, a larger amount of amorphous powder remained on the foliage and fruit of the trees.

EXAMPLE 3

Example 1 was repeated, eliminating the HEDPA from both applications of water. Following evaporation of the water, a crystalline mineral deposit remained on the foliage and fruit of the trees. The crystalline mineral deposit was very difficult to remove from the foliage and fruit.

EXAMPLE 4

Example 1 was repeated using a flow rate of 10 gpm per acre for both applications of water. Following evaporation of the water, a small amount of amorphous powder remained on the foliage and fruit of the trees. The remaining amorphous powder was easily wiped from the surface of the foliage and fruit.

EXAMPLE 5

Example 1 was repeated using 1 ppm HEDPA for both applications of water. Following evaporation of the water, a small amount of amorphous powder remained on the foliage and fruit of the trees. The remaining amorphous powder was easily wiped from the surface of the foliage and fruit.

EXAMPLE 6

Example 1 was repeated using water with a hardness of about 450 ppm. Following evaporation of the water, a small amount of amorphous powder remained on the foliage and fruit of the trees. The remaining amorphous powder was easily wiped from the surface of the foliage and fruit.

What is claimed:

1. A method of inhibiting the formation of crystalline mineral deposits on a plant comprising:
   providing water containing deposit forming minerals;
   forming a mixture by admixing an effective amount of 1-hydroxyethane 1, 1-diphosphonic acid (HEDPA) with said water, said HEDPA being present in an amount sufficient to alter the deposit forming minerals such that, following evaporation of the water, the minerals will appear as an amorphous powder;
   applying a first portion of said mixture to a plant such that a part of said first portion of said mixture contacts the surface of the plant;

allowing said first portion of said mixture to evaporate from the surface of said plant such that a first layer of an amorphous powder is formed on the surface of said plant; and applying a second portion of said mixture to said plant, said second portion having a flow sufficient to wash substantially all of said first layer of said amorphous powder off of the surface of the plant.

2. The method of claim 1, wherein said effective amount of HEDPA is at least about ¼ ppm.

3. The method of claim 2, wherein said effective amount of HEDPA is between about ¼ ppm to about 5 ppm.

4. The method of claim 3, wherein said effective amount of HEDPA is about 1 ppm.

5. The method of claim 1, wherein said flow of said second portion of said mixture is at least eight gallons per minute per acre.

6. The method of claim 5, wherein said flow of said second portion of said mixture is between eight gallons per minute per acre and forty gallons per minute per acre.

7. The method of claim 6, wherein said flow of said second portion of said mixture is about twenty-five gallons per minute per acre.

8. The method of claim 1, wherein said method further includes allowing said second portion of said mixture to evaporate from the surface of said plant such that a second layer of an amorphous powder is formed on the surface of said plant and applying a third portion of said mixture to said plant, said third portion having a flow sufficient to wash substantially all of said second layer of said amorphous powder off of the surface of the plant such that substantial accumulation of amorphous powder on the plant is minimized.

9. In a method for inhibiting the formation of crystalline mineral deposits on a plant by spraying the plant with water which touches a surface of the plant, said water containing deposit forming minerals, the improvement comprising:

admixing an effective amount of 1-hydroxyethane 1, 1-diphosphonic acid (HEDPA) with said water to form a water mixture, said HEDPA being present in an amount sufficient to alter the deposit forming minerals such that, following evaporation of the water, the minerals will appear as an amorphous powder;

applying a first portion of said water mixture on a surface of said plant;

allowing a sufficient time for evaporation of said water such that an initial layer of amorphous powder is formed on the surface of the plant;

applying a second application of said water mixture on the surface of said plant, said second application of said water mixture having a sufficient flow to wash substantially all of said initial layer of amorphous powder off of the surface of the plant.

10. The improvement of the method of claim 9, wherein said method further includes applying a portion of said water mixture on the surface of said plant periodically to prevent an accumulation of said amorphous powder, said portion of said water mixture having a flow sufficient to wash substantially all of said previously formed amorphous powder off of the surface of the plant.

11. A method of inhibiting the formation of crystalline mineral deposits on a plant comprising:

providing water containing deposit forming minerals;

forming a water mixture by admixing an effective amount of 1-hydroxyethane 1, 1-diphosphonic acid (HEDPA) with said water, said HEDPA being present in an amount sufficient to alter the deposit forming minerals such that, following evaporation of the water, the minerals will appear as an amorphous powder;

applying a portion of said water mixture to a plant such that a part of said portion of said water mixture contacts a surface of the plant; and allowing said portion of said water mixture to evaporate from the surface of said plant such that an amorphous powder is formed on the surface of said plant.

12. The method of claim 11, wherein said method further includes mechanically agitating said amorphous powder on said plant such that said amorphous powder is moved out of contact with the surface of the plant.

13. The method of claim 12, wherein said mechanical agitation is provided by applying a flow of air across the surface of the plant, said flow of air being sufficient to move the amorphous powder out of contact with the surface of the plant.

14. The method of claim 12, wherein said mechanical agitation is provided by mechanically brushing the amorphous powder from the surface of the plant.

15. The method of claim 12, wherein said mechanical agitation is provided by mechanically washing the amorphous powder from the surface of the plant.

* * * * *